United States Patent [19]

Emal et al.

[11] 4,042,739

[45] Aug. 16, 1977

[54] JOINT TAPE FOR DRY WALL CONSTRUCTION HAVING WATER-INITIATED ADHESIVE WHICH ONCE ACTIVATED, ATTACHED TO, AND DRIED ON A SURFACE RESISTS REMOVAL UNDER REMOISTENING CONDITIONS

[76] Inventors: Earl A. Emal, P.O. Box 377, Commerce City, Colo. 80022; Jack L. Lambert, 114 S. 12th St., Brighton, Colo. 80601

[21] Appl. No.: 738,307

[22] Filed: Nov. 3, 1976

[51] Int. Cl.² .................... B32B 3/24; B32B 3/26; C09J 7/04
[52] U.S. Cl. ................... 428/137; 428/156; 428/350
[58] Field of Search ............ 428/137, 156, 350

[56] References Cited

U.S. PATENT DOCUMENTS

| | | | |
|---|---|---|---|
| 2,031,275 | 2/1936 | McLaurin | 428/350 |
| 2,768,096 | 10/1956 | Toulmin | 428/350 |
| 3,104,179 | 9/1963 | Prior | 428/350 |
| 3,592,682 | 7/1971 | Weiner et al. | 428/350 |
| 3,730,825 | 5/1973 | Nakane | 428/350 |

*Primary Examiner*—J.C. Cannon

[57] ABSTRACT

A joint tape for use in building construction utilizing dry wall panels which includes a tape body of water absorbent paper, sized and shaped for smooth joints between dry wall building panels, and a layer of water-activable polyvinyl acetate-based adhesive on one side of the tape for wetting and then adhering the tape to the surface of adjoining dry wall sheets covering the joint therebetween.

3 Claims, 5 Drawing Figures

JOINT TAPE FOR DRY WALL CONSTRUCTION HAVING WATER-INITIATED ADHESIVE WHICH ONCE ACTIVATED, ATTACHED TO, AND DRIED ON A SURFACE RESISTS REMOVAL UNDER REMOISTENING CONDITIONS

BACKGROUND OF THE INVENTION

This invention is directed to a water absorbing paper tape for covering the joints between wallboard panels in construction. It is more specifically directed to a dry wall joint tape which is precoated on one side with a water-activable polyvinyl acetate-based adhesive for securing the tape of the wall boards covering the joints.

Conventional dry wall construction commonly involves attaching sheets of gypsum board, dry wall panels, sheet rock or the like to the framing members forming partitions and walls in construction. Thus, a joint is provided between each pair of sheets. The sheets are normally provided with two tapered edges (along the long sides) so as to produce a very shallow depression at the joint. This depression is deepest at the edge of the joint and tapers outwardly to the planar surface of the dry wall panel.

A common method of construction is to seal the joints between wall covering sheets by adhering a strip of tape to the joint with an aqueous, cementous type adhesive commonly called joint compound. First, the adhesive is applied in a thin coat to the joint and then the tape is laid over the joint so as to be bonded by the adhesive. Afterwards, an additional coat of adhesive is applied over the joint and smoothed to cause the joint to blend completely with the surfaces of the wall board. After drying, the joint is recovered with the joint compound and again dried. It is then sanded smooth for painting. The tape provides strength for the joint, preventing cracking of the adhesive and providing a base for the adhesive over any openings at the joint between the two adjacent sheets.

PURPOSE OF THE INVENTION

Included among the objects and advantages of the present invention is to provide an improved tape for covering the joint between adjacent wall boards without the necessity of using a separate cementous material to adhere the tape to the panel surfaces.

Another object of the invention is to provide an improved tape for closing the joint of abutting edges of adjacent dry wall panels by the use of a polyvinyl acetate adhesive precoating on one side of the tape which can be pre-activated by merely wetting with water prior to application.

Another object of the invention is to provide an improved wall board joint tape which is simple to apply with its self-contained adhesive, thereby reducing the number of layers of joint compound necessary to form a monolithic wall construction.

A still further object of the present invention is to provide an improved wall board joint tape which is simple to apply with its self-contained adhesive, thereby reducing the number of layers of joint compound necessary to form a monolithic wall construction.

A still further objects of the present invention is to provide an improved wall board joint tape which is water absorbent and yet which includes a self-contained polyvinyl acetate adhesive which cannot be removed from the wall by moisture after it has been applied.

BRIEF DESCRIPTION OF DRAWINGS

Other features of this invention will appear in the following description and appended claims, reference being made to the accompanying drawings forming a part of the specification wherein like reference characters designate corresponding parts is the several views.

DESCRIPTION OF SPECIFIC EMBODIMENTS

Figure 1:
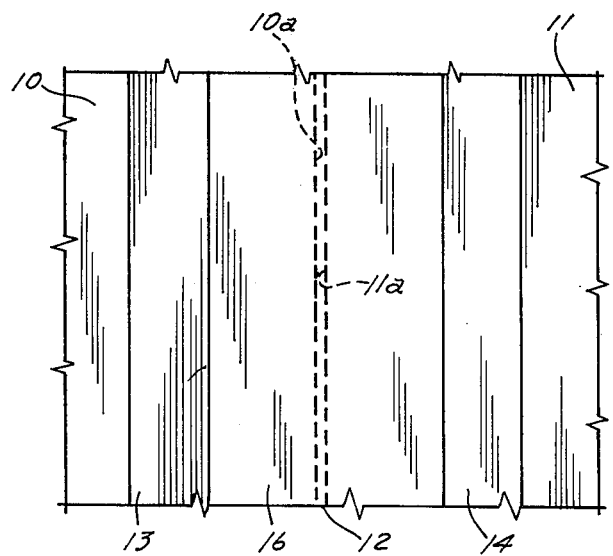
FIG. 1 is a partial side elevation view of a joint between adjacent wall panels showing the use of the tape according to the present invention.

Turning now more specifically to the drawings, FIG. 1 shows a portion of dry wall panels 10, 11 which have been installed in abutting or adjacent position with their edges 10a and 11a in close proximity forming a seam or joint 12 in accordance with standard building practices. The portion 13, 14 of the surface of the panels 10, 11 adjacent to the edges 10a and 11a are tapered inwardly towards the edge to provide a shallow depression 15 in the area of abutment. The shallow depression 15 provides for the placement of joint tape 16 and joint cement compound over the tape 16 with sufficient thickness to provide a monolith or smooth, planar surface over the joint 12 which will be level with the surface of the panels 10, 11.

The tape 16 according to the present invention, is a thin, rectangular elongated strip of water absorbing paper tape coated on one side with a dried, moistenable or water soluble polyvinyl acetate adhesive 17, that is of the type which is activated by moistening or wetting the adhesive. Before application to the joint, the tape 16 is first passed through a water container or the strip of tape is submerged in water and is then applied to the joint. Once the adhesive 17 is dried further wetting, such as from the moisture present in a joint cement compound, has no effect on loosening the adhesive and the tape remains intact. The tape 16, after it has been applied, leaves a sufficient depth in the edge depression 15 to allow the joint compound to be applied so as to cover and fill the depression.

Adhesives useful with the tape of the present invention include water activable, synthetic resin-based adhesives comprising the homopolymer of polyvinyl acetate, specifically No. Z-5136 adhesive manufactured by Swift Chemical Company, a division of Swift & Company, Chicago, Illinois. Such adhesives are activated or moistened by exposure to water. Once the adhesive is activated and the tape is applied and dried, the adhesive becomes impervious to further exposure to water and the tape cannot be removed by being soaked or wetted again.

The tape 16 is intended to be made from a fibrous material such as paper which is also water absorbent.

This absorbency is required so that the water-based joint compound or cement will readily adhere to the tape and provide for a smooth covering over the tape and the depression at the edge of the wall board.

Figure 2:
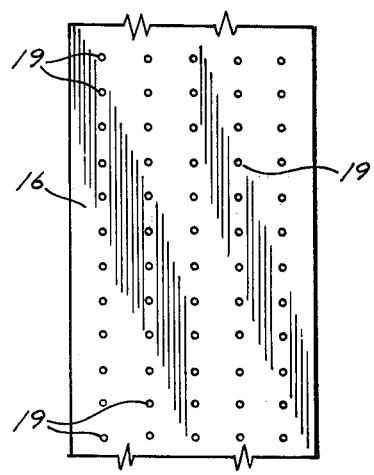
FIG. 2 is an enlarged detail view of the tape as applied in FIG. 1.
Figure 3:
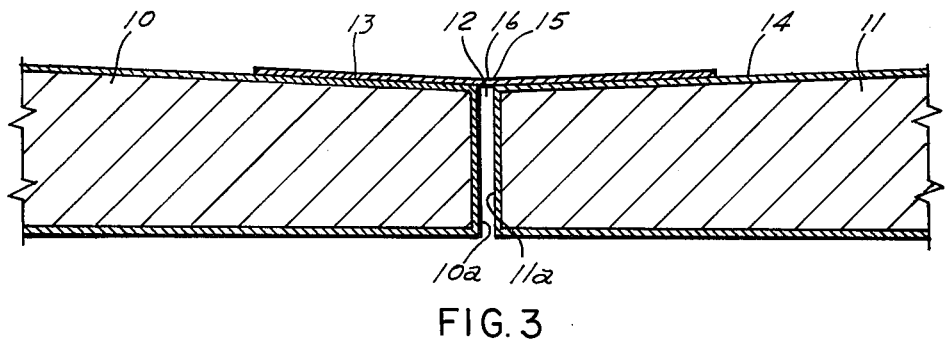
FIG. 3 is an enlarged end view of a wall board joint showing the application of the tape of the present invention.
Figure 4:
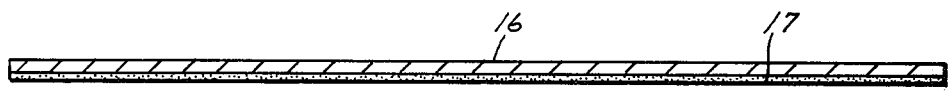
FIG. 4 is an enlarged cross sectional view of the tape according to the present invention showing the strip of water absorbent paper and the moisture activated polyvinyl acetate adhesive layer.

As shown in FIG. 2, the surface of the tape may be perforated with holes 19 arranged longitudinally along its central portion to permit any air which may be trapped under the tape to escape. This is provided to prevent air bubbles from being formed under the tape 17 which would prevent the surface of the tape to adhere to the wall board and thus provide a loose or inconsistent area.

Figure 5:
FIG. 5 is an enlarged cross sectional view of an alternative embodiment of the tape of FIGS. 2–4 showing the strip of water absorbent paper having a central area of increased thickness and the moisture activated polyvinyl acetate adhesive layer.

As shown in FIG. 5, the cross sectional configuration of the tape may alternatively include a flat surface covered with the layer of adhesive and an opposite surface 20 defined by a slightly thickened center portion 21 of the tape so that the tape is applied to the tapered edges 13, 14 of adjacent wall board panels 10, 11, the tape is bent slightly to cause the opposite surface 20 to be generally flat. The same adhesive can be applied to this tape as described above.

The joint tape, according to the present invention, may be applied under any normal construction conditions, either inside or outside of a building so long as the temperature is at least at, or slightly above the freezing point of water or above. Thus, the tape may be applied in buildings under construction which are not heated and the temperature within the building may be quite cool.

The tape may be applied without any special applicator and thus provides a valuable item for use by do-it-yourself installers. The only requirement is that a container of water be available so the entire length of tape which is to be immediately applied can be immersed for several seconds prior to application. Since the tape has its own polyvinyl acetate-based adhesive, it provides a stronger joint than tape applied with a joint compound as these joints must rely upon the strength of the compound itself for adherence of the tape to the wall board after the joint compound hardens.

Additionally, as more fully pointed out by the examples herebelow, the use of a polyvinyl acetate based adhesive on the tape as previously described results in a joint tape having superior characteristics to a joint tape applied with conventional animal-based, or vegetable or starch-based adhesives.

EXAMPLE I

Strips of conventional dry wall joint tape are prepared by applying a relatively even, thin layer of the following adhesives to one side of the strips:

| Group | Adhesive |
| --- | --- |
| A | Swift's 42185, an animal-based adhesive manufactured by Swift & Company |
| B | Starch adhesive, a vegetable-based adhesive manufactured by Paisly Co. |
| C | No. Z-5136, a polyvinyl acetate-based adhesive manufactured by Swift Chemical Company, Chicago, Illinois 60604. |

The adhesives are then permitted to dry on the strips under uniform drying conditions.

One strip from each of the groups A, B and C is immersed in water for a period of ten seconds and then applied to a conventional paper covered sheetrock or dry wall board. The three strips are then permitted to dry for a period of about 24 hours. The dry wall board and the attached strips are then completely immersed in water. The strip from Group B releases from the wall board almost immediately after being immersed in the water. The strip from Group A releases from the wall board after being immersed in the water for about 30 minutes. The strip from Group C remains firmly adhered to the wall board after immersion for 30 minutes. This example illustrates the impervious nature of the polyvinyl acetate-based adhesive to exposure to water after the tape strip has been applied and allowed to dry.

EXAMPLE II

One strip from Group C of Example I is applied to a piece of conventional dry wall board and exposed to outdoor varying weather conditions for a period of six months. The strip remains firmly adhered to the board and appears to be unaffected by exposure to moisture, sunlight and wide variations in ambient temperature conditions.

EXAMPLE III

One strip from each of Groups A, B and C of Example I is immersed in water and then applied to a piece of conventional dry wall board. The strips are then tested for bonding to the boards by pulling on a corner of each strip. The strip of Group A is easily moveable and slideable on the wall board for up to about 5 minutes. The strip of Group B is easily moveable and slideable on the wall board for about 5 minutes or more. The strip of Group C adheres firmly to the wall board in about 15 seconds. The relatively fast bonding of the tape to the wall board with the polyvinyl acetate-based adhesive permits faster and more efficient taping of joints with the tape of the invention.

EXAMPLE IV

One strip from each of Groups A, B and C is immersed in water and then applied to a joint between two pieces of conventional dry wall board. The joints are then subjected to stress by slightly moving the pieces of wall board. Slight movement of the pieces of wall board joined by the strip of Group C does not result in a partial breaking of the bond between the strip and the board and therefore no air bubbles are formed beneath the strip. The strip of Group C may then be covered with a smooth coating of conventional joint compound or "mud" without the inclusion of air bubbles in the joint.

While a joint tape having a moistenable, polyvinyl acetate-based adhesive has been shown and described in detail, it is obvious that this invention is not to be considered as being limited to the exact form disclosed, in that changes in detail and construction may be made therein within the scope of the invention, without departing from the spirit thereof.

What is claimed is:

1. A joint tape for covering and sealing the joints between adjacent wall board panels comprising:
   a thin, parallel sided, elongated strip of water absorbing paper tape; and
   a dried, water moistenable, polyvinyl acetate-based adhesive layer applied to completely cover the surface area of one side of said tape whereby the adhesive layer may be moistened with water to activate the adhesive layer so that the tape may be applied directly to the wall board joint to seal adjacent wall board panels together, said joint tape being further characterized in that after being moistened and applied to said panels and dried, the tape cannot be removed by remoistening the adhesive layer.

2. A joint tape as defined in claim 1, wherein:
said paper tape is perforated with a series of holes in longitudinal rows along the central portion of the strip.

3. A joint tape as defined in claim 1, wherein:
the cross sectional configuration of said tape includes a flat surface covered with the layer of polyvinyl acetate-based adhesive and an opposite surface defined by a slightly thickened center portion of the tape so that as the tape is applied to tapered edges of adjacent wall board panels, the tape is bent slightly to cause the opposite surface to be generally flat.

* * * * *